(12) United States Patent
Liston et al.

(10) Patent No.: US 6,814,294 B2
(45) Date of Patent: Nov. 9, 2004

(54) USER CONFIGURABLE REMOTE CONTROL

(75) Inventors: Lee Liston, Redfern (AU); Adrian Yee, Downer (AU); Bob Matchett, Mosman (AU)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 09/949,771

(22) Filed: Sep. 12, 2001

(65) Prior Publication Data

US 2002/0066785 A1 Jun. 6, 2002

(30) Foreign Application Priority Data

Sep. 12, 2000 (AU) .............................................. PR0084

(51) Int. Cl.⁷ ................................................. G06K 7/10
(52) U.S. Cl. .................................. 235/472.01; 235/486
(58) Field of Search ........................ 235/472.01, 462.01, 235/472.02, 472.03, 492, 486, 487, 375, 382, 381; 361/683; 356/71

(56) References Cited

U.S. PATENT DOCUMENTS

| | | | | |
|---|---|---|---|---|
| 4,202,120 A | * | 5/1980 | Engel | 283/99 |
| 4,338,025 A | * | 7/1982 | Engel | 356/71 |
| 5,002,062 A | | 3/1991 | Suzuki | 128/696 |
| 5,311,302 A | * | 5/1994 | Berry et al. | 348/14.03 |
| 5,353,016 A | | 10/1994 | Kurita et al. | 340/825.22 |
| 5,461,222 A | * | 10/1995 | Haneda | 235/492 |
| 5,601,489 A | | 2/1997 | Komaki | 463/44 |
| 5,877,488 A | * | 3/1999 | Klatt et al. | 235/486 |
| 5,949,492 A | | 9/1999 | Mankovitz | 348/473 |
| 5,973,475 A | | 10/1999 | Combaluzier | 320/107 |
| 6,014,593 A | | 1/2000 | Grufman | 700/136 |
| 6,229,694 B1 | * | 5/2001 | Kono | 361/683 |

FOREIGN PATENT DOCUMENTS

| | | |
|---|---|---|
| AU | 199953527 | 4/2000 |
| CA | 2262180 | 8/2000 |
| DE | 36 37 684 | 5/1987 |
| EP | 0 469 581 | 2/1992 |
| EP | 0 729 109 | 8/1996 |
| JP | 59-123986 | 7/1984 |
| JP | U03-071329 | 3/1991 |
| JP | 04-88547 | 3/1992 |
| WO | 90/04238 | 4/1990 |
| WO | WO 95/35534 | 12/1995 |

OTHER PUBLICATIONS

U.S. Patent Publication No. 2001/0017616, Kobayashi, Publication Date, Aug. 30, 2001, Class, 345, subclass 173.

* cited by examiner

*Primary Examiner*—Thien M. Le
(74) *Attorney, Agent, or Firm*—Fitzpatrick, Cella, Harper & Scinto (57) ABSTRACT

A controller (101) is configured for the reading of so-called electronic "smart cards" which are configured to operate as a control template. The controller (101) is formed of a housing (102) incorporating a control template receptacle (104) and a viewing area (106). The receptacle (104) includes an access opening (110) through which a smart card (300) is insertable. An upper boundary of the viewing area (106) is defined by a sensor in the form of a substantially transparent pressure sensitive membrane (108). Arranged beneath the membrane (108) is a data reader provided in the form of an arrangement of exposed electrical contacts (107) configured to contact complementary contacts of the smart card (300).

21 Claims, 7 Drawing Sheets

USER CONFIGURABLE REMOTE CONTROL

TECHNICAL FIELD OF THE INVENTION

The present invention relates to a control device for use with a control template or smart card. The invention has been developed primarily for use with remote control systems, and will be described hereinafter with reference to these and other applications. However, it will be appreciated, particularly in view of the number of alternative examples given, that the invention is not limited to this field of use.

BACKGROUND ART

Control pads of various types are known and used across a relatively wide variety of fields. Typically, such pads include one or more keys, buttons or pressure responsive areas which upon application of suitable pressure by a user, generate a signal which is supplied to associated control circuitry.

Unfortunately, prior art control pads are somewhat limited, in that they only allow for a single configuration of keys, buttons or pressure sensitive areas. Standard layouts rarely exist in a given field, and so a user is frequently compelled to learn a new layout with each control pad they use. For example, many automatic teller machines ("ATMs") and electronic finds transfer at point of sale ("EFTPOS") devices use different layouts, notwithstanding their relatively similar data entry requirements. This can be potentially confusing for a user who must determine for each control pad the location of buttons required to be depressed. The problem is exacerbated by the fact that such control pads frequently offer more options than the user is interested in, or even able to use.

Overlay templates for computer keyboards and the like are known. However they are relatively inflexible in design terms and require a user to correctly configure the system with which the keyboard is associated, each time the overlay is to be used.

International Application No PCT/FR95/00827 published in French under PCT Publication No. WO 95/35534, an English language translation of which is conveniently available as Australian Patent Publication No AU-A-28896/95, discloses a smart card reading device intended for the remote control of equipment, for example. That document disclosed a smart card reader operable as a remote control for a television or video recorder in which a smart card, having user interpretable icons or indicia printed thereon, is inserted into a reader beneath a transparent keypad. The icons and keys of the keypad were regularly arranged enabling the user to select a function corresponding to the underlying indicia. Contained within the electronic memory of the smart card was a mapping of the indicia to the individual keys enabling the reader to transmit to the television or video recorder an instruction to perform a function.

Another card reading device described in Australian Patent Publication No. AU-A-53527/99 comprises a controller, having a housing which includes a smart card receptacle and viewing area. The controller also includes a sensor means in the form of a transparent pressure sensitive membrane covering the viewing area. A smart card including control indicia can be inserted into the control template receptacle, such that the pressure sensitive membrane covers the upper face of the smart card. The control indicia are visible within the viewing area through the pressure sensitive membrane. However, the specific configuration of such a device is problematic, and involves maximising the functional area of the card, as well as facilitating card insertion and removal.

SUMMARY OF THE INVENTION

It is an object of the present invention to substantially overcome, or at least ameliorate, one or more disadvantages of existing arrangements.

According to one aspect of the present invention there is provided an electronic card reader for reading an electronic card having a substrate and an electronic memory having data stored therein for controlling data controlled equipment, said electronic reader comprising:

a touch sensitive substantially transparent membrane having an upper surface configured to be depressible by a user of said reader;

a receptacle shaped to receive said electronic card, said receptacle being arranged beneath said transparent membrane, wherein an inner support surface of said receptacle has a substantially curved contour configured to guide said electronic card into a fully inserted position and wherein said electronic card received therein can be viewed through said touch sensitive membrane; and electronic circuitry means coupled to said membrane to read said data from said memory according to depression of said membrane, said data controlled equipment having a function controlled by receipt of said data and communicating with said electronic card reader to receive said data therefrom.

According to another aspect of the present invention there is provided an electronic card reader for reading an electronic card having a substrate and an electronic memory having data stored therein, said electronic reader comprising:

a touch sensitive substantially transparent membrane having an upper surface configured to be depressible by a user of said reader;

a receptacle shaped to receive said electronic card, said receptacle being arranged beneath said transparent membrane, wherein an inner support surface of said receptacle has a substantially curved contour configured to guide said electronic card into a fully inserted position and wherein said electronic card received therein can be viewed through said touch sensitive membrane; and electronic circuitry means coupled to said membrane to read said data from said memory according to depression of said membrane.

According to still another aspect of the present invention there is provided an electronic card reader having no moving parts, said reader being configured for reading an electronic card having a substrate and an electronic memory having data stored therein, said electronic reader comprising:

a touch sensitive substantially transparent membrane having an upper surface configured to be depressible by a user of said reader;

a receptacle shaped to receive said electronic card, said receptacle being arranged beneath said transparent membrane, wherein an inner support surface of said receptacle has a substantially curved contour configured to guide said electronic card into a fully inserted position and wherein said electronic card received therein can be viewed through said touch sensitive membrane; and electronic circuitry means coupled to said membrane to read said data from said memory according to depression of said membrane.

According to still another aspect of the present invention there is provided an electronic card reader having no moving parts, said reader being configured for reading an electronic card having a substrate and an electronic memory having data stored therein, said electronic reader comprising:

a receptacle shaped to receive said electronic card, said receptacle being arranged beneath a touch sensitive substantially transparent membrane, wherein an inner support surface of said receptacle has a substantially curved contour configured to guide said electronic card into a fully inserted position and wherein said electronic card received therein can be viewed through said touch sensitive membrane; and electronic circuitry means coupled to said membrane to read said data from said memory according to depression of said membrane by a user.

According to still another aspect of the present invention there is provided a reader apparatus for an electronic smart card device characterised by a transparent touch panel configured to overly said smart card device when arranged in a reading position and by the absence of moving parts by which said user configures said smart card device in said reading position.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function (s) or operation(s), unless the contrary intention appears.

Figure 1:
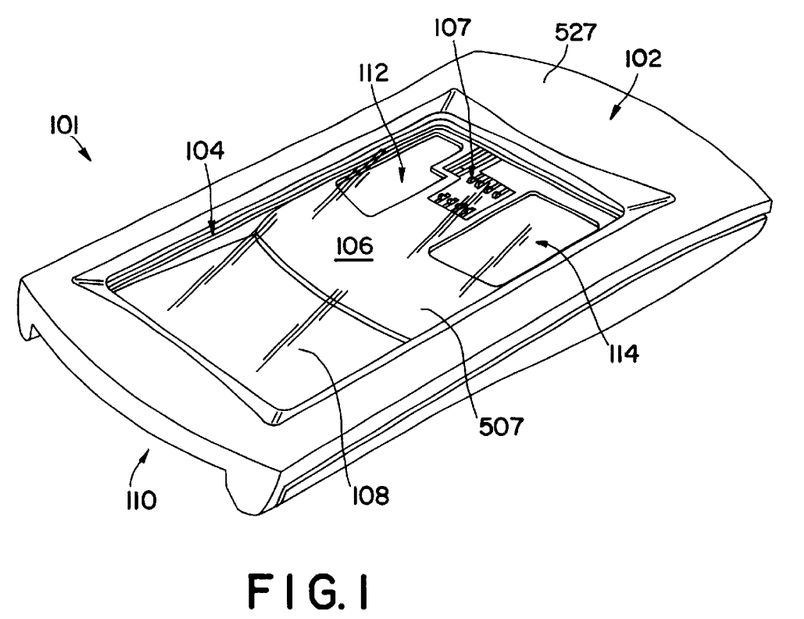
FIG. 1 is a perspective view of a "bottom-entry" controller.
Figure 2:
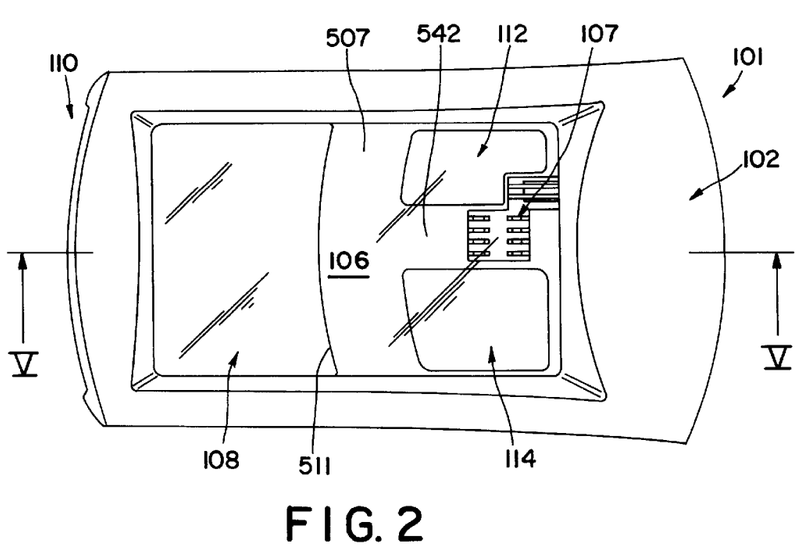
FIG. 2 is a plan view of the controller of FIG. 1.
Figure 3:
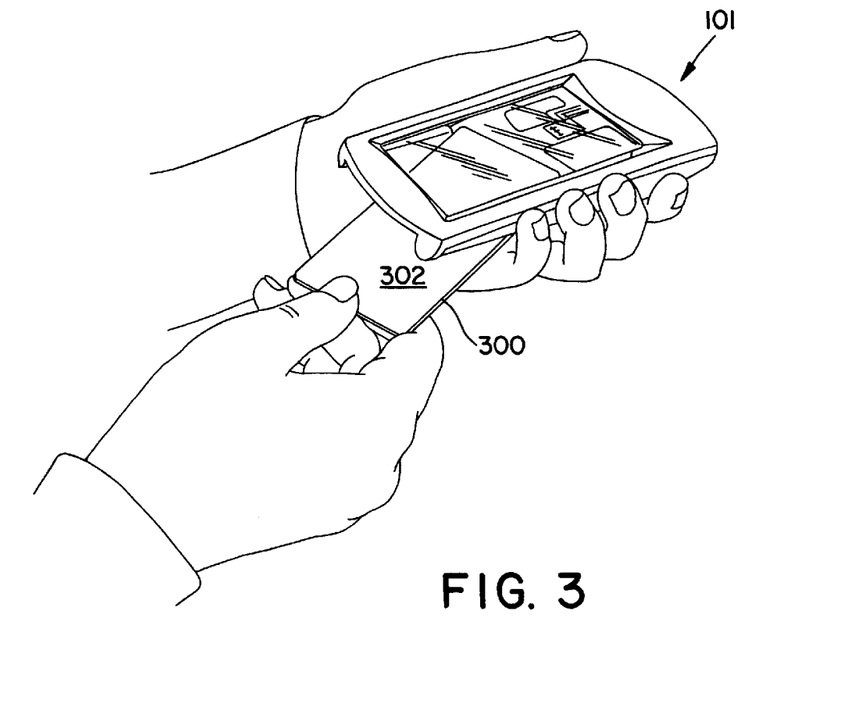
FIG. 3 shows a user inserting a smart card into the controller of FIG. 1.

FIGS. 1 and 2 show a controller 101 configured for the reading of so-called electronic "smart cards" which are configured to operate as a control template. The controller 101 is formed of a housing 102 incorporating a control template receptacle 104 and a viewing area 106. The receptacle 104 includes an access opening 110 through which a smart card 300, seen in FIG. 3 is insertable, An upper boundary of the viewing area 106 is defined by sensor means in the form of a substantially transparent pressure sensitive membrane 108. Arranged beneath the membrane 108 is data reading means provided in the form of an arrangement of exposed electrical contacts 107 configured to contact complementary contacts of the smart card 300.

Figure 11:
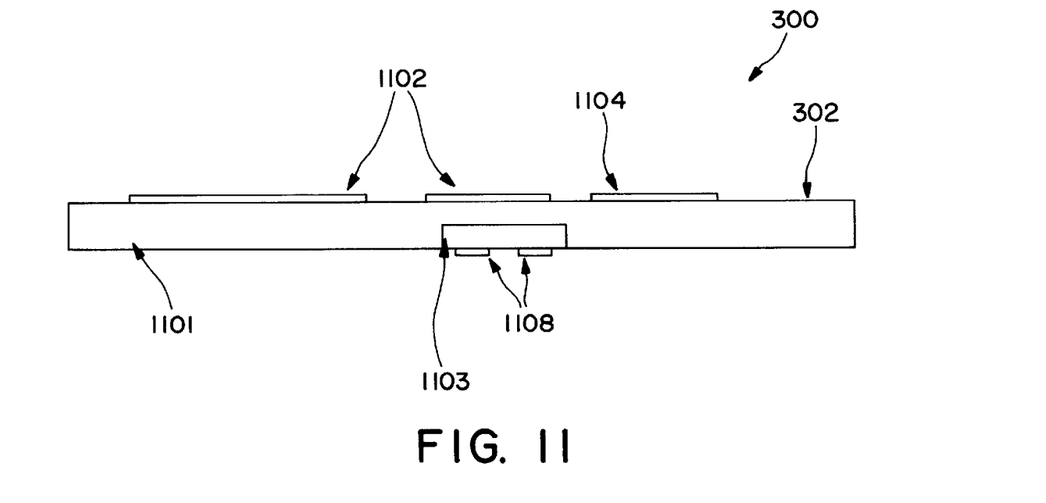
FIG. 11 is a longitudinal cross-sectional view of the smart card shown in FIG. 3.

Referring to FIG. 11, the smart card 300 is formed by a laminar substrate 1101 and an on-board memory chip 1103. The chip 1103 includes data contacts 1108 typically unitarily formed with the memory chip 1103 and complementing the contacts 107 of the controller 101. The smart card 300 is configured as a control template for the controller 101 by incorporating on an upper surface 302 of the substrate 1101 a number of icons or indicia 1102 and 1104 and by programming or otherwise storing within the chip 1103, mapping data related to the specific region of the surface 302 defined by the corresponding icons/indicia 1102. The icons/indicia 1102, 1104 may be formed on the card by printing directly onto the surface 302 or alternately transferring the icons/indicia, for example using an adhesive label. The icons may be grouped as control icons 1102 and non-control icons 1104. Non-control icons 1104 are non-functional and have no corresponding stored mapping data, but may include instructional text and/or promotional/advertising material.

The smart card 300 is inserted into the controller 101 via the access opening 110 as shown in FIG. 3. The configuration of the controller 101 allows a user to hold the controller 101 in one hand and easily insert the smart card 300 into the controller 101 with their other hand. When the smart card 300 is fully inserted into the controller 101, the pressure sensitive membrane 108 fully covers the upper face 302 of the smart card 300. The viewing area 106 preferably has substantially the same dimensions as the upper face 302 of the smart card 300 such that the upper face 302 is, for all intents and purposes, filly visible within the viewing area 106 through the transparent pressure sensitive membrane 108.

The exposed contacts 107 and electronic circuitry associated therewith are configured to read the mapping data associated with the control indicia from the memory chip 1103, either automatically upon insertion of the smart card 300 into the control template receptacle 104, or selectively in response to a signal from the controller 101. This signal can, for example, be transmitted to the smart card 101 via the exposed contacts 107 and data contacts 1108.

Figure 4:
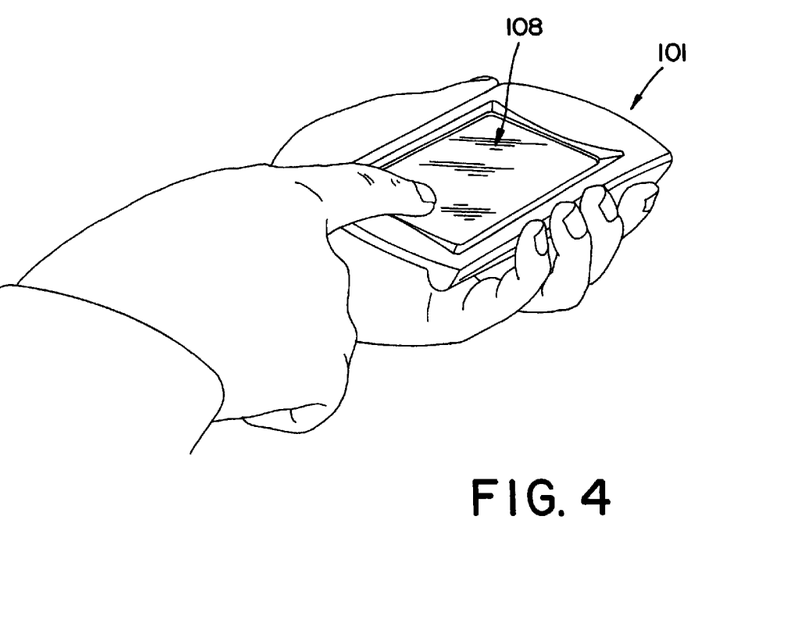
FIG. 4 shows a user operating the controller of FIG. 1 after a smart card has been fully inserted.

Once the mapping data associated with the control indicia 1102 has been read, a user can press areas of the pressure sensitive membrane 108 on or adjacent the underlying control indicia, as shown in FIG. 4. By sensing the pressure on the pressure sensitive membrane 108 and referring to the mapping data, the controller 101 can deduce which of the control indicia 1102 the user has selected. For example, if the user places pressure on the pressure sensitive membrane 108 adjacent control indicia configured as a "play" button, the controller 101 will assess the position at which the pressure was applied, refer to the mapping data, and determine that the "play" button was selected. This information can then be used to control a video running on an associated video console (of conventional construction and not shown).

Figure 5A:
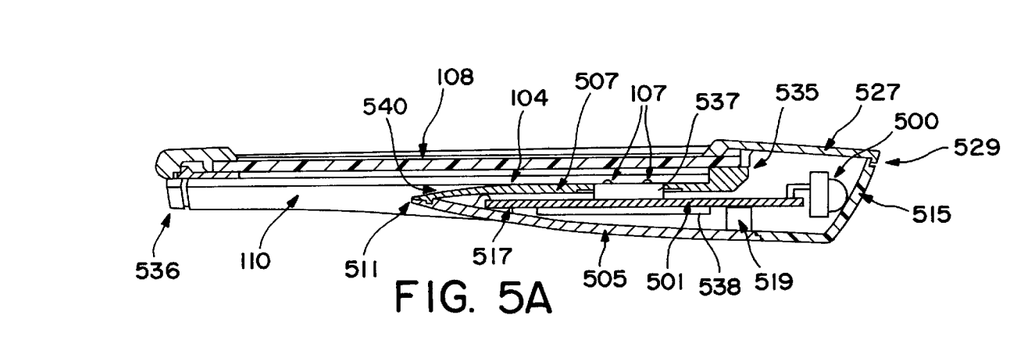
FIG. 5A is a longitudinal cross-sectional view along the line V—V of FIG. 2.
Figure 5B:
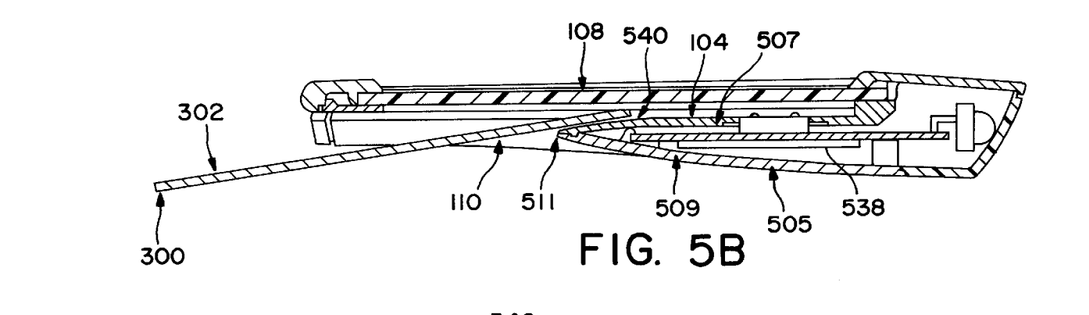
FIG. 5B is a view similar to FIG. 5A, with a smart card partially inserted into the receptacle of the controller.
Figure 5C:
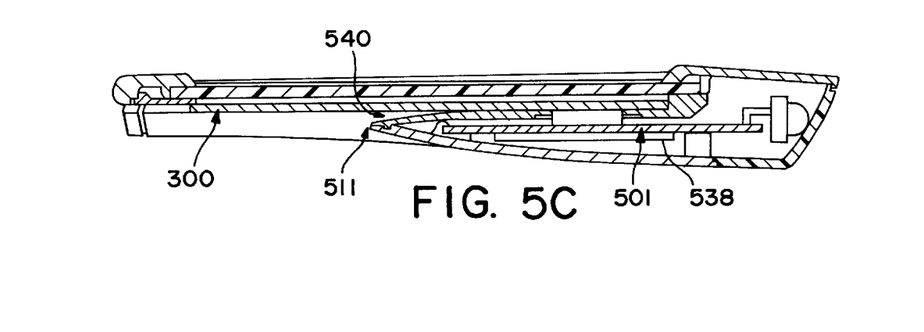
FIG. 5C is a view similar to FIG. 5A, with a smart card fully inserted into the control template receptacle of the controller.

Referring to FIGS. 5A to 5C, the housing 102 is formed of a substantially two part outer shell defined by a top section 527 that surrounds the membrane 108 and a base section 505 which extends from a connection 529 with the top section 527 to a location 511 below and proximate the transverse centre of the membrane 108. The base section 505 incorporates a facing end 515 formed from infrared (IR) transparent material thereby permitting IR communications being emitted by the controller.

The location 511 defines a point of connection between the base section 505 a card support surface 507 which extends through a plane in which the contacts 107 lie to an interior join 535 that sandwiches the membrane 108 between the surface 507 and the top section 527. From this arrangement it will be appreciated that the access opening 110 is defined by the space between the location 511 and a periphery 536 of the housing 102, seen in FIG. 5A.

The contacts 107 extend from a connector block 537 mounted upon a printed circuit board 501 positioned between the base section 505 and support surface 507 by way of the two mountings 517 and 519. Arranged on an opposite side of the PCB to the connector block 537 is electronic circuitry 538, electrically connected to the connectors 107 and the touch sensitive membrane 108 and configured for reading data from the card 300 according to depression of the membrane 108. Mounted from the PCB 501 is an infrared light emitting diode (LED) 500 positioned adjacent the end 515 which acts as an IR window for communications with a device to be controlled.

FIG. 5B shows a similar view to FIG. 5A, with the smart card 300 partially inserted through the access opening 110 into the receptacle 104. As can be seen in FIG. 5B, the support surface 507 has an integrally formed curve contour 540 that leads downward from the plane of the contacts 107 towards the join 511. This configuration allows the controller 101 to receive the smart card 300 such that the smart card 300 may be initially angled to the plane of the receptacle 104, as seen in FIG. 5B. The curve contour 540 configuration of the support surface 507 guides the smart card 300 into a fully inserted position under the force of a user's hand. Specifically, as the card 300 is further inserted, the curvature of the support surfaces guides the card 300 into the plane of the contacts 107 and receptacle 104.

The access opening 110 is configured to be as large as possible while still allowing a fully inserted card 300 to be held securely in place. The configuration of the access opening 110 simplifies the action of inserting and removing the smart card 300 for the user such that it can be achieved with little or no visual interaction. Further, configuration of the receptacle 104 allows a smart card 300 to be inserted and removed without excessive force being required from the user. Thus, the configuration of the controller 101 provides for easy and intuitive insertion and removal of the smart card 300, by the user.

When the smart card 300 is inserted into the receptacle 104, the configuration of the receptacle 104 is such that the card 300 is held securely in place and can not accidentally fall out of the receptacle 104 under the force of gravity or through rough use. When the smart card 300 has been fully and correctly inserted into the receptacle 104 by the user, the controller 101 is preferably configured to signal this state by sounding an audible tone which can be generated, for example, by a piezo transducer (not shown) mounted upon the printed circuit board 501. Such an audible tone can give helpful feedback to the user, about the smart card 300 insertion action, and conveys to the user a strong level of confidence that the card 300 has been correctly inserted.

FIG. 5C shows a similar view to FIG. 5A, with the smart card 300 fully inserted into the receptacle 104. In this position, the card 300 lies in the plane of the receptacle 104 and the contacts 107 which touch an associated one of the data contacts 1108 of the smart card 300, and the smart card 300 is covered by the pressure sensitive membrane 108. Further, the contacts 107 are preferably spring contacts, the force of which against the card 300, provides for the card 300 to be held within the receptacle by a neat interference fit. The configuration of the controller 101 ensures that the card 300 is as close as possible to the transparent pressure sensitive membrane 108, thus reducing parallax error when the user is viewing the inserted card 300 from any angle.

Returning to FIGS. 1 and 2, it is seen that the support surface 507, moving away from the location 511, comprises a central spine 542 that defines the plane in which the contacts 107 lie, and two scalloped portions or rebates 112 and 114 either side of the spine 542, each of which define areas slightly lower than the plane of the contacts 107. This configuration provides that the peripheries of the card 300 do not act to disturb the formation and maintenance of the contact between the contacts 107 and 1108. The card 300 is removed from the receptacle 104 merely by applying finger pressure to the underside of the card 300 at a location within the opening 110 and sliding the card 300 to break the interference fit described above. As the card 300 slides away from contact, the curvature of the surface 507 permits the free end to drop to the position shown in FIG. 5B, where again the card 300 may be fully grasped by the user.

Figure 6:
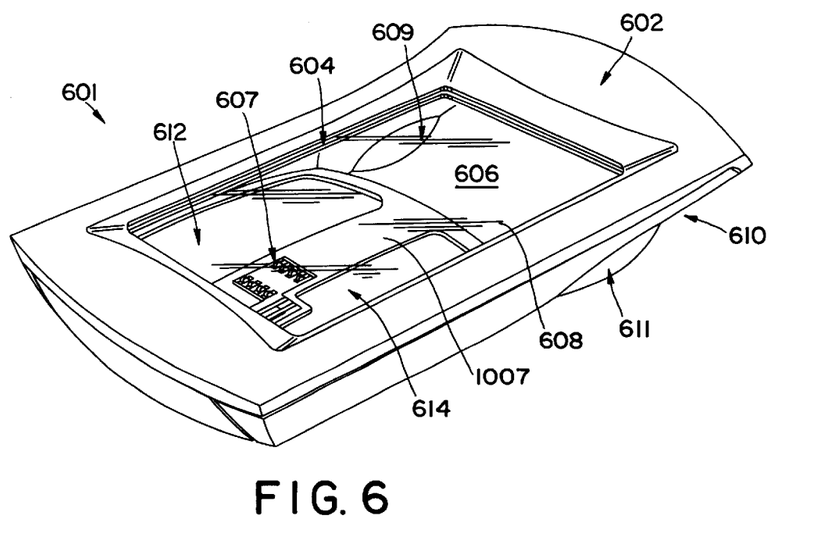
FIG. 6 is a perspective view of a "top-entry" controller.
Figure 7:
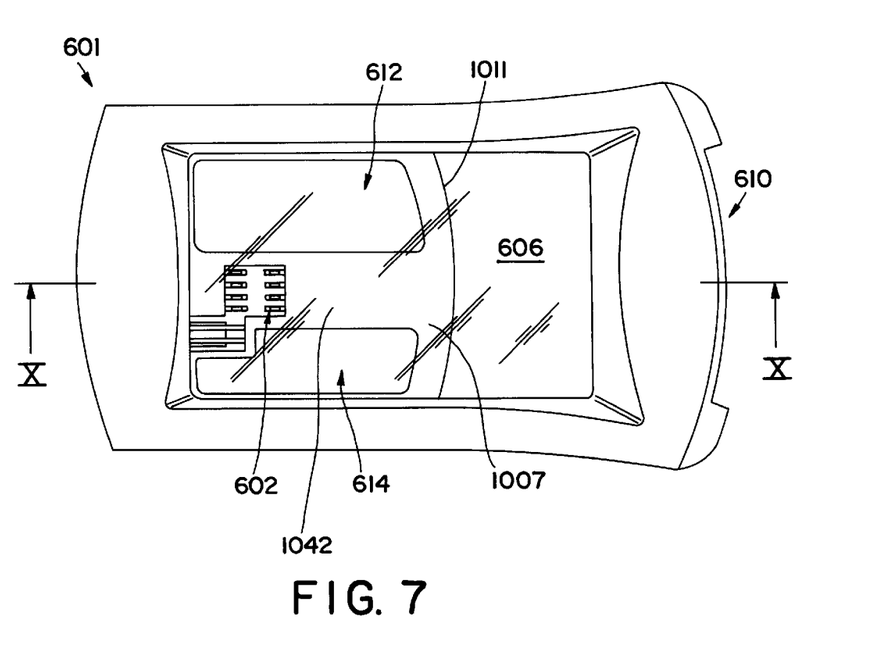
FIG. 7 is a plan view of the controller of FIG. 6.
Figure 8:
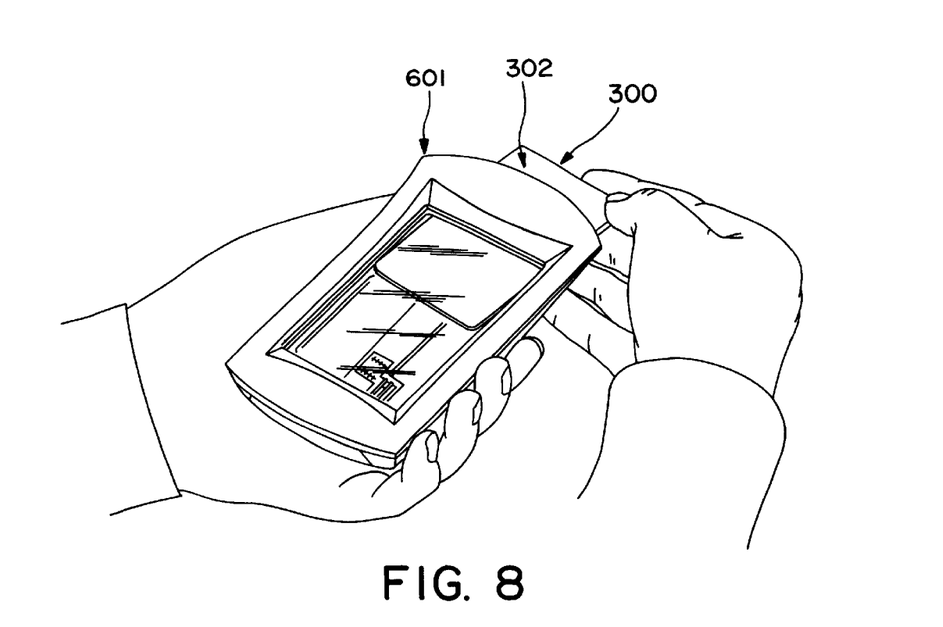
FIG. 8 shows a smart card being inserted by a user into the controller of FIG. 6.

FIGS. 6 to 10C show a top entry controller 601. As seen in FIGS. 6 and 7, the controller 601 is formed of a housing 602 incorporating a control template receptacle 604 and a viewing area 606. The receptacle 604 includes an access opening 610 through which the smart card 300, seen in FIG. 8, is insertable. The access opening 610 of the receptacle 604 is configured in the opposite end of the controller 601 to the corresponding access opening 110 of the control template receptacle 104 of the controller 101.

An upper boundary of the viewing area 606 is defined by sensor means in the form of a substantially transparent pressure sensitive membrane 608. Arranged beneath the membrane 608 is data reading means provided in the form of an arrangement of exposed electrical contacts 607 similar to the contacts 107 of the bottom entry controller 101.

FIG. 8 shows the smart card 300 being inserted by a user into the controller 601. The smart card 300 is inserted into the controller 601 via the access opening 610 of the control template receptacle 604. Comparing FIG. 3 to FIG. 8, the smart card 300 is inserted at a corresponding opposite end of the controller 601 to the controller 101. The configuration of the controller 601 allows a user to hold the controller 601 in one hand and easily insert the smart card 300 into the controller with their other hand. The smart card 300 can be fully inserted into the controller 601 such that in use the pressure sensitive membrane 608 fully covers the upper face 302 of the smart card 300.

The viewing area 606 preferably has substantially the same dimensions as the upper face 302 of the smart card 300 such that the upper face 302 is, for all intents and purposes, fully visible within the viewing area 606 through the transparent pressure sensitive membrane 608.

The operation of the exposed contacts 607 and electronic circuitry associated therewith operate in substantially the same manner as the exposed contacts 107 and associated circuitry of the controller 101 as described above.

Figure 9:
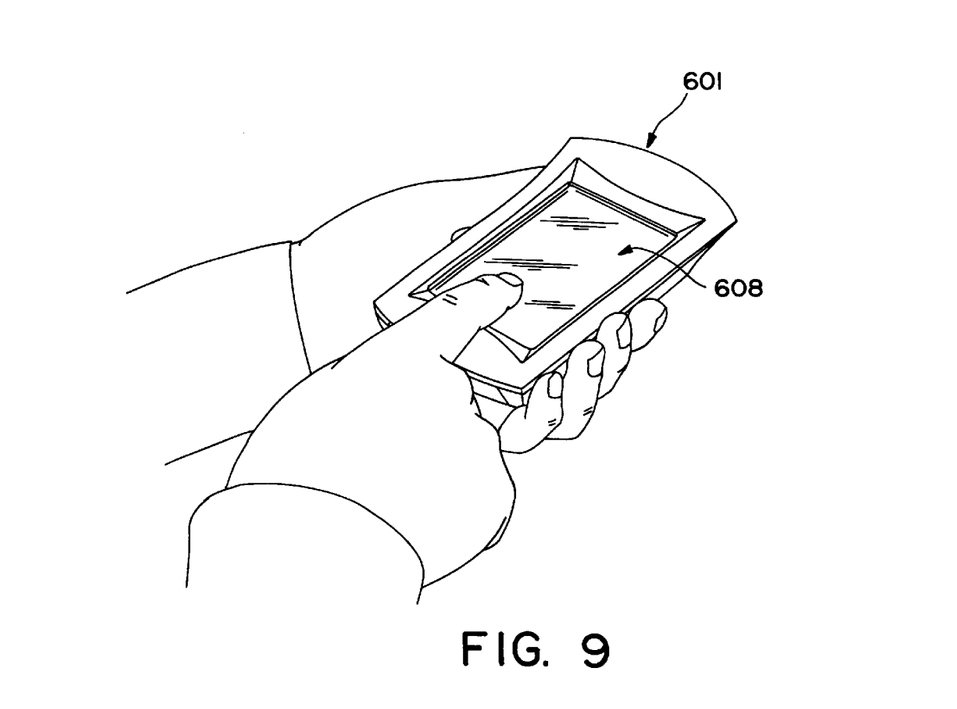
FIG. 9 shows a user operating the controller of FIG. 6 after a smart card has been fully inserted.

As shown in FIG. 9, the user can hold the controller 601 in one hand and select areas of the pressure sensitive membrane 608 with their other hand. By sensing the pressure on the pressure sensitive membrane 608 and referring to the mapping data, the controller 601 can deduce which of the control indicia 1102 the user has selected, as described above for the controller 101.

Figure 10A:
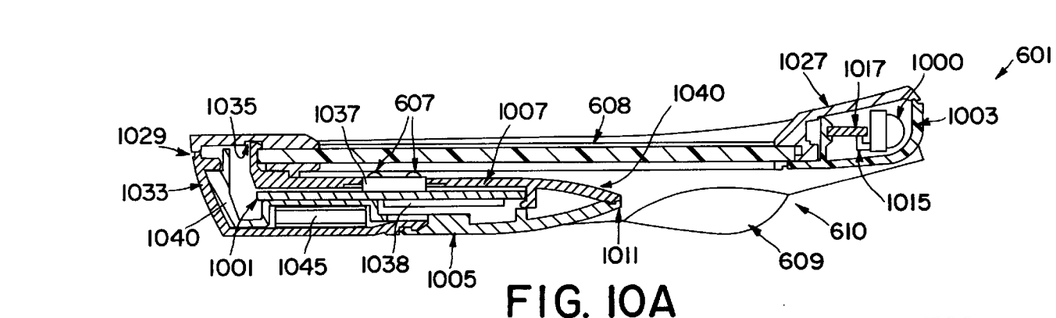
FIG. 10A is a longitudinal cross-sectional view along the line V—V of FIG. 7 of the controller of FIG. 6.
Figure 10B:
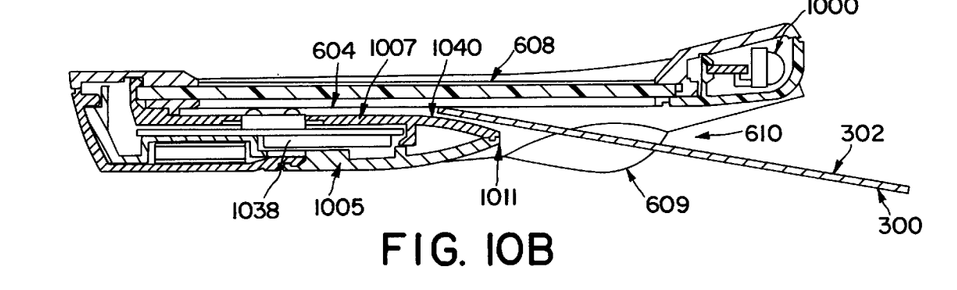
FIG. 10B is a view similar to FIG. 10A, with a smart card partially inserted into the control template receptacle of the controller.
Figure 10C:
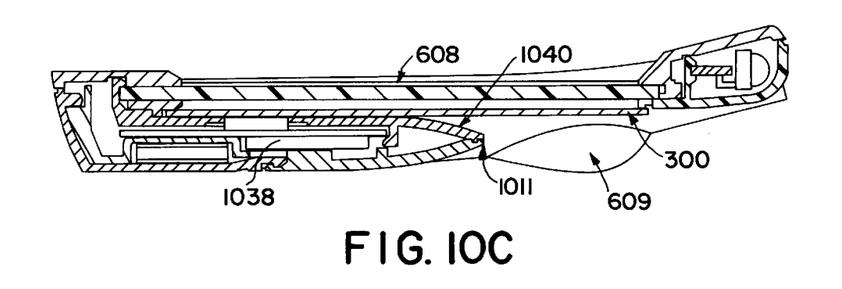
FIG. 10C is a view similar to FIG. 10A, with a smart card fully inserted into the control template receptacle of the controller.

Referring to FIGS. 10A to 10C, the housing 602 is formed of a substantially two part outer shell defined by a top section 1027 that surrounds the membrane 608 and a base section 1005 which extends from a connection 1029 with the top section 1027 to a location 1011 below and proximate the transverse centre of the membrane 608. The base section 1005 incorporates a removable battery cover 1033 which encloses a battery 1045 used to supply power to the controller 601. The base section 1005 also includes a facing end 1003 formed from infrared (IR) transparent material thereby permitting IR communications being emitted by the controller.

The location 1011 defines a point of connection between the base section 1005 a card support surface 1007 which extends through a plane in which the contacts 607 lie to an interior join 1035 that sandwiches the membrane 608 between the surface 1007 and the top section 1027. From this arrangement it will be appreciated that the access opening 610 is defined by the space between the location 1011 and the facing end 1003, as seen in FIG. 10A.

The contacts 607 extend from a connector block 1037 mounted upon a printed circuit board 1001 positioned between the base section 1005 and support surface 1007 by way of support section 1040. Arranged on an opposite side of the PCB to the connector block 1037 is electronic circuitry 1038, electrically connected to the connectors 607 and the touch sensitive membrane 608 and configured for reading data from the card 300 according to depression of the membrane 608. The controller 601 includes an infrared light emitting diode (LED) 1000 positioned adjacent the facing end 1003 which acts as an IR window for communications with a device to be controlled. The LED 1000 has an associated transmitter PCB 1017 connected to the IR light emitting diode (LED) 1000 via an electrical connection 1015. The PCB 1001 is connected to the transmitter PCB 1017 via associated electrical connections (not shown).

FIG. 10B shows a similar view to FIG. 10A, with the smart card 300 partially inserted through the access opening 610 into the receptacle 604. As can be seen in FIG. 10B, the support surface 1007 has an integrally formed curve contour 1040 that leads downward from the plane of the contacts 1007 towards the location 1011. This configuration allows the controller 601 to receive the smart card 300 such that the smart card 300 may be initially angled to the plane of the receptacle 604, as seen in FIG. 10B. The curve contour 1040 configuration of the support surface 1007 guides the smart card 300 into a fully inserted position under the force of a user's hand. Specifically, as the card 300 is further inserted, the curvature of the support surfaces guides the card 300 into the plane of the contacts 607 and receptacle 604. Further, the insertion of the smart card 300 into the receptacle 604 does not occlude the signal from the IR light emitting diode (LED) 1000 at any stage.

Similar to the controller 101, the access opening 610 of the controller 601 is configured to be as large as possible while still allowing a fully inserted card 300 to be held securely in place. This simplifies the action of inserting and removing the smart card 300 for the user such that it can be achieved with little or no visual interaction. Further, configuration of the receptacle 604 allows a smart card 300 to be inserted and removed without excessive force being required from the user. Thus, the configuration of the controller 601 provides for easy and intuitive insertion and removal of the smart card 300, by the user.

When the smart card 300 is inserted into the receptacle 604, the configuration of the receptacle 604 is such that the card 300 is held securely in place and can not accidentally fall out of the receptacle 604 under the force of gravity or through rough use. When the smart card 300 has been fully and correctly inserted into the receptacle 604 by the user, the controller 101 is preferably configured to signal this state by sounding an audible tone which can be generated, for example, by a piezo transducer (not shown) mounted upon the printed circuit board 1001. Such an audible tone can give helpful feedback to the user, about the smart card 300 insertion action, and conveys to the user a strong level of confidence that the card 300 has been correctly inserted.

FIG. 10C shows a similar view to FIG. 10A, with the smart card 300 fully inserted into the receptacle 604. In this position, the card 300 lies in the plane of the receptacle 604 between the horizontal planes of the control board 1001 and the transmitter control board 1017, thereby providing a very compact housing 602. Further, the contacts 607 touch an associated one of the data contacts 1108 of the fully inserted smart card 300, and the smart card 300 is covered by the pressure sensitive membrane 608. Still further, the contacts 607 are preferably spring contacts, the force of which against the card 300, provides for the card 300 to be held within the receptacle by a neat interference fit. The configuration of the controller 601 ensures that the card 300 is as close as possible to the transparent pressure sensitive membrane 108, thus reducing parallax error when the user is viewing the inserted card 300 from any angle.

Returning to FIGS. 6 and 7, it is seen that the support surface 1007, moving away from the location 1011, comprises a central spine 1042 that defines the plane in which the contacts 607 lie, and two scalloped portions or rebates 612 and 614 either side of the spine 1042, each of which define areas slightly lower than the plane of the contacts 607. This configuration provides that the peripheries of the card 300 do not act to disturb the formation and maintenance of the contact between the contacts 607 and 1108. The card 300 is removed from the receptacle 604 merely by applying finger pressure to the underside of the card 300 at a location within the opening 610 and sliding the card 300 to break the interference fit described above. As the card 300 slides away from contact, the curvature of the surface 1007 permits the free end to drop to the position shown in FIG. 10B, where again the card 300 may be fully grasped by the user.

As shown in FIG. 6, the controller 601 includes two feet 609 and 611, which are integrally formed into either side of the housing 602 of the controller 601. The feet 609 and 611 allow a smart card 300 to be inserted when the controller 601 is lying on a flat surface with the viewing area 606 facing upward. The feet 609 and 611 also enable a user to see the viewing area 606 more easily when the controller 601 is lying on a flat surface. The insertion of the smart card 300 into the receptacle 604 does not occlude the signal from the IR light emitting diode (LED) 1000 at any stage.

In an alternative arrangement, the control template shown in FIG. 11 can take the form of a control card (not shown). The control card can still include control indicia. However, the storage means can take the form of a magnetic strip formed along an edge of a reverse face of the control card.

The mapping data is stored on the magnetic strip in a conventional manner. A corresponding controller (not shown) for this arrangement includes a magnetic read head positioned at or adjacent an entrance to the corresponding control template receptacle. As the control card is slid into the control receptacle, the mapping data is preferably automatically read from the magnetic strip by the magnetic read head. The controller is then operated as described in relation to the arrangements described above.

In still another alternative arrangement of a control template in the form of a control card, the storage means can take the form of machine readable indicia. The machine readable indicia can take the form of a barcode formed along an edge of a reverse face of the card. The mapping data can be suitably encoded, and then printed. A corresponding controller (not shown) for this arrangement can include an optical read head positioned at or adjacent an entrance to the associated control template receptacle. As the card of this further alternative arrangement is slid into the control receptacle, the mapping data is automatically read from the barcode by the optical read head. Alternatively, the barcode can be scanned using a barcode reader associated with the controller immediately prior to inserting the control template, or scanned by an internal barcode reader scanner once the control template has completely been inserted. The control template is then operated as described in relation to the above described arrangements of FIGS. 1 and 6. It will be appreciated that the position, orientation and encoding of the barcode can be altered to suit a particular application. Moreover, any other form of machine readable indicia can be used, including embossed machine-readable figures, printed alpha-numeric characters, punched or otherwise formed cut outs or even optical or magneto optical indicia.

The preferred control template comprises a (programmable) smart card which can be customisable by a third party (viz a party other than the manufacturer of the card and/or card reader). The third party may be the ultimate user of the card itself, or may be an intermediary between the manufacturer and user. In one application, the smart card is programmed and customised for one touch operation to obtain a service over a network, in a conventional manner. Examples of services over the network include activating a link to an Internet site associated with a smart card such that site can be reached and displayed on a display device (eg. a TV screen). Used in the manner described above, a smart card can give a user easy access to a range of Internet services including on-line shopping, home banking, listening to music, watching movies, playing on-line games, finding information on restaurants, checking latest sporting results, viewing a digital phot album, or sending a video e-mail. Other examples include controlling a video recorder or an alternative control template can represent a magazine the contents of which can be "browsed" using the control indicia. In another application, the smart card 300 can be programmed for obtaining a service locally at a set top box. In a still further application, the smart card 300 can be programmed for obtaining a service both remotely and locally. For instance, the smart card can be programmed to retrieve an application remotely from a network and load it on a set top box. The latter smart card may be additionally programmed to obtain a service from the loaded application on the set top box.

It will be appreciated by those skilled in the art that the controllers need not have a touch sensitive membrane and in the manner of card readers 101 and 601. Instead other touch detecting arrangements are able to be used. One of these is a regular array of capacitor plates formed in the base of the receptacle of a controller. Since the card is essentially an insulator, the capacitors can sense the approach of the tip of the human finger since the self capacitance of the finger tip disturbs the charge on the opposite capacitor.

Alternatively, the rear face of the smart card 300 can be printed with conductive ink into a series of pads all set out in a regular array with each paid connected by a corresponding thin connector to a corresponding electrical contact. Again, the approach of a human finger tip against the front face of the smart card causes a change in charge at the electrode corresponding to the pad opposite the point of approach.

As described above, the controllers 101 and 601 do not have any moving parts and are therefore convenient to use. Further, the configuration of the controllers 101 and 601 result in the controllers 101, 601 being robust. Still further, the controllers 101 and 601 are relatively cheaper to manufacture compared to prior art arrangements.

Other non-limiting examples of sensing means capable of providing an indication of a user's selection include ultrasonic sensors, laser tracking systems, heat sensors or chemical detectors. It will also be appreciated that, where a pressure sensitive membrane is used, the pressure sensitivity can either be interpreted as a simple binary threshold, or as a multi-level or even substantially continuous pressure input. In one arrangement, software which drives the pressure sensitive membrane can allow a user to slide a finger across the surface of the membrane to indicate an increase or decrease in a value. For example, if a user drags a finger across the pressure sensitive membrane from left to right, this can be interpreted as an increase in, say, volume for a television remote control.

The foregoing describes only some embodiments of the present invention, and modifications and/or changes can be made thereto without departing from the scope and spirit of the invention, the embodiments being illustrative and not restrictive.

What is claimed is:

1. An electronic card reader for reading an electronic card having a substrate and an electronic memory having data stored therein for controlling data controlled equipment, said electronic reader comprising:

a touch sensitive substantially transparent membrane having an upper surface configured to be depressible by a user of said reader;

a receptacle shaped to receive said electronic card through an opening formed by said receptacle, said receptacle being arranged beneath said transparent membrane and comprising an inner support surface, said inner support surface comprising a substantially curved contour adjacent to said opening, said curved contour being configured to guide said electronic card into a fully inserted position upon application of pressure to a portion of said electronic card adjacent to said opening and to secure said electronic card within said receptacle, such that said electronic card received therein can be viewed through said touch sensitive membrane and a free end of said electronic card remains exposed enabling said electronic card to be removed from said receptacle upon application of pressure substantially to another portion of said electronic card adjacent to said opening; and electronic circuitry means coupled to said membrane to read said data from said memory according to depression of said membrane, said data controlled equipment having a function controlled by receipt of said data and communicating with said electronic card reader to receive said data therefrom.

2. The card reader of claim 1, wherein said touch sensitive substantially transparent membrane has at least one dimension substantially equal to at least one dimension of said electronic card.

3. The card reader of claim 1, further including a transmitter for communicating said data read from said memory to said data controlled equipment.

4. The card reader of claim 3, wherein said receptacle is configured at an opposite end of said card reader to said transmitter.

5. The card reader of claim 3, wherein said receptacle is configured at the same end of said card reader as said transmitter.

6. The card reader of claim 1, wherein said reader has substantially no moving parts.

7. An electronic card reader for reading an electronic card having a substrate and an electronic memory having data stored therein, said electronic reader comprising:

a touch sensitive substantially transparent membrane having an upper surface configured to be depressible by a user of said reader;

a receptacle shaped to receive said electronic card through an opening formed by said receptacle, said receptacle being arranged beneath said transparent membrane and comprising an inner support surface, said inner support surface comprising a substantially curved contour adjacent to said opening, said curved contour being configured to guide said electronic card into a fully inserted position upon application of pressure to a portion of said electronic card adjacent to said opening and to secure said electronic card within said receptacle, such that said electronic card received therein can be viewed through said touch sensitive membrane and a free end of said electronic card remains exposed enabling said electronic card to be removed from said receptacle upon application of pressure substantially to another portion of said electronic card adjacent to said opening; and electronic circuitry means coupled to said membrane to read said data from said memory according to depression of said membrane.

8. The card reader of claim 7, wherein said touch sensitive substantially transparent membrane has at least one dimension substantially equal to at least one dimension of said electronic card.

9. The card reader of claim 7, further including a transmitter for communicating said data read from said memory to data controlled equipment.

10. The card reader of claim 9, wherein said receptacle is configured at an opposite end of said card reader to said transmitter.

11. The card reader of claim 9, wherein said receptacle is configured at the same end of said card reader as said transmitter.

12. The card reader of claim 7, wherein said reader has substantially no moving parts.

13. An electronic card reader having no moving parts, said reader being configured for reading an electronic card having a substrate and an electronic memory having data stored therein, said electronic reader comprising:

a touch sensitive substantially transparent membrane having an upper surface configured to be depressible by a user of said reader;

a receptacle shaped to receive said electronic card through an opening formed by said receptacle, said receptacle being arranged beneath said transparent membrane and comprising an inner support surface, said inner support surface comprising a substantially curved contour adjacent to said opening, said curved contour being configured to guide said electronic card into a fully inserted position upon application of pressure to a portion of said electronic card adjacent to said opening and to secure said electronic card within said receptacle, such that said electronic card received therein can be viewed through said touch sensitive membrane and a free end of said electronic card remains exposed enabling said electronic card to be removed from said receptacle upon application of pressure substantially to another portion of said electronic card adjacent to said opening; and electronic circuitry means coupled to said membrane to read said data from said memory according to depression of said membrane.

14. The card reader of claim 13, wherein said touch sensitive substantially transparent membrane has at least one dimension substantially equal to at least one dimension of said electronic card.

15. The card reader of claim 13, further including a transmitter for communicating said data read from said memory to data controlled equipment.

16. The card reader of claim 15, wherein said receptacle is configured at an opposite end of said card reader to said transmitter.

17. The card reader of claim 15, wherein said receptacle is configured at the same end of said card reader as said transmitter.

18. An electronic card reader having no moving parts, said reader being configured for reading an electronic card having a substrate and an electronic memory having data stored therein, said electronic reader comprising:

a receptacle shaped to receive said electronic card through an opening formed by said receptacle, said receptacle being arranged beneath a touch sensitive substantially transparent membrane and comprising an inner support surface, said inner support surface comprising a substantially curved contour adjacent to said opening, said curved contour being configured to guide said electronic card into a fully inserted position upon application of pressure to a portion of said electronic card adjacent to said opening and to secure said electronic card within said receptacle, such that said electronic card received therein can be viewed through said touch sensitive membrane and a free end of said electronic card remains exposed enabling said electronic card to be removed from said receptacle upon application of pressure substantially to another portion of said electronic card adjacent to said opening; and electronic circuitry means coupled to said membrane to read said data from said memory according to depression of said membrane by a user.

19. An electronic card reader for reading data stored in an electronic memory of an electronic card, said electronic card reader comprising:

a touch sensitive substantially transparent membrane having an upper surface configured to be depressible by a user;

a receptacle having an upper member holding said touch sensitive substantially transparent membrane and a lower member, said members defining a space therebetween and into which said electronic card is insertable, wherein said lower member is curved toward said upper member and has a stopper for stopping said electronic card inserted into said space; and electronic circuitry means coupled to said membrane to read said data from said electronic memory according to depression of said membrane.

20. An electronic card reader according to claim 19, wherein said lower member comprises a connecting terminal for electronically connecting with said memory.

21. An electronic card according to claim 19, wherein said stopper is parallel to said upper and lower members, respectively.

* * * * *

UNITED STATES PATENT AND TRADEMARK OFFICE
CERTIFICATE OF CORRECTION

PATENT NO. : 6,814,294 B2
DATED : November 9, 2004
INVENTOR(S) : Lee Liston et al.

It is certified that error appears in the above-identified patent and that said Letters Patent is hereby corrected as shown below:

<u>Title page,</u>
Item [56], References Cited, U.S. PATENT DOCUMENTS, insert
-- 5,796,085 8/1998 Bleier………………..235/441 --.

Signed and Sealed this

Twenty-first Day of June, 2005

JON W. DUDAS
*Director of the United States Patent and Trademark Office*